United States Patent Office 3,041,243
Patented June 26, 1962

3,041,243
SEALING COAT FOR TABLETS AND THE LIKE
Norio Sugimoto, Otsu-shi, Shiga-ken, Isamu Utsumi, Sakyo-ku, Kyoto-shi, and Tadao Ida, Nara-ken, Japan, assignors to Tanabe Seiyaku Co., Ltd., Osaka, Japan, a corporation of Japan
No Drawing. Filed July 19, 1960, Ser. No. 43,711
Claims priority, application Japan July 25, 1959
10 Claims. (Cl. 167—82)

This invention relates to a sealing coat for oral medicaments in the form of tablets, pills, granules and like to protect their contents, and to articles sealed with the coat.

It is known to give a sealing coat to compressed tablets to protect their contents from moisture before the tablets are covered with a plurality of coatings of sugar syrup to which powdered filler is added during the intermediate drying after the application of each coating. A sealing coat is also required when tablets are coated with a water-soluble film-forming material such as gelatin. Sometimes, such a sealing coat is applied to a tablet containing unstable substances such as vitamins, hormones and antibiotics to prevent deterioration. Heretofore, such a sealing coat has consisted of a film forming material insoluble in water such as shellac, nitrocellulose or polyvinyl acetate. Such a coat is practically insoluble in water and dilute acid, and therefore sufficient thickness of the coat for elimination of absorption of moisture and/or oxygen results in an increase in disintegration time in the gastric juices.

The object of this invention is to provide a new and improved sealing coat for oral medicaments in the form of tablets, pills, granules and like whereby these medicaments are protected from moisture and/or oxygen or other substances which tend to cause variations in their medicinal value without any increase in disintegration time in gastric juices.

According to the invention, compressed tablets and similar articles are sealed with a water-insoluble but acid-soluble film-forming polymer selected from the group consisting of poly-2-vinylpyridine, poly-4-vinylpyridine, poly-2-methyl-5-vinylpyridine, poly-5-ethyl-2-vinylpyridine and copolymers of said vinylpyridine compounds with a co-monomer selected from the group consisting of vinyl acetate, acrylonitrile, methyl acrylate and styrene.

Most of the said homopolymers and copolymers of the vinylpyridines are known. There are many discussions on preparation, properties and utilities of the polymers of various vinylpyridine compounds, but no suggestion concerning on the medical use of the polymers are described. The polymers employed in this invention may be prepared by polymerizing said vinylpyridine monomer alone or with the said co-monomer according to the known method. Polymerization may be carried out under a standard condition which is known to those skilled in the art. Among many kinds of polymerization technique, emulsion- or solution-polymerization is conveniently applicable. For example, the recipe which consists of one of the vinylpyridine monomers or its mixture with the co-monomer, methanol and a small amount of benzoyl-peroxide is heated at a temperature of 20° to 70° C. until the conversion is essentially completed and then is fractionated by partial precipitation with a caustic alkali. Another example of the preferred recipe is the vinyl-pryidine monomer alone, a dilute acid such as hydrochloric acid and sulfuric acid, and a small amount of potassium persulfate. The copolymers may also be prepared using a recipe which consists of a mixture of the vinylpyridine and the co-monomer, dilute sulfuric acid, polyoxyethylene monostearate and a small amount of potassium persulfate.

The production of such vinylpyridine resins themselves are not a part of this invention and any of said vinylpyridine polymers and copolymers which are soluble in dilute acids but insoluble in water may be used.

The therapeutic material to be sealed with these resins may be coated by a usual method using a solution of one of the said polymers.

The solutions are conveniently prepared by dissolving the polymers in solvents such as methanol, ethanol, chloroform, carbon tetrachloride and benzene to the extent of 5% to 30%.

The solutions are then applied by pouring under the rotation of a coating-pan wherein tablets or the like are placed. Alternatively, the application may be carried out by spraying or dipping. The solvents are allowed to evaporate whereby the sealing coat of the invention are formed. In the said manner several layers of the film-forming polymer may be applied successively until a required thickness of the coat is obtained. In our experiments about 50 to 250 microns of thickness of the coat are preferable to give a sufficient resistance to moisture and/or oxygen. Such a thickness of the coating material generally disintegrates from 5 to 20 minutes in the acidic medium of the stomach.

The sealed medicaments of the invention show a high degree of stability on storage. The invention is, therefore, particularly suitable for use in the manufacture of tablets and similar articles containing unstable active substances such as vitamins, hormones and similar substances. More particularly, it is suitable for use in the sealing of compressed tablets and like containing hygroscopic active materials such as powdered extracts, bile salts, liver extracts and some colloidal materials.

The following examples will serve to indicate and illustrate more specifically the nature of this invention without limiting it to the details set forth therein:

EXAMPLE 1

A mixture containing 45% of starch, 43% of lactose, 7% of dextrine and 5% of talc is compressed into a tablet of 8 mm. diameter, 7.5 mm. radius of curvature and 4 mm. thickness. These tablets are given a plurality of coatings by means of dipping them in the solution of the coating material. Coating materials used are prepared under the conditions as shown in Table 1. Coating conditions and the result of disintegration test both in distilled water and artificial gastric juice are shown in Table 2.

EXAMPLE 2

A mixture of each of the following pharmaceutical compositions A, B and C is compressed into a tablet respectively, in which a slugging method is applied to A and B while in C, a wet-granulation method, using methanol is applied.

Formula A:

|  | Mg. |
|---|---|
| Acetylsalicylic acid | 115 |
| Starch | 15 |
|  | 130 |

Formula B:

| Acetylsalicylic acid | 50 |
|---|---|
| Antipyrin | 30 |
| Phenacetin | 30 |
| Starch | 38 |
| Magnesium stearate | 2 |
|  | 150 |

Formula C:

| | Mg. |
|---|---|
| Thiamine mononitrate | 5 |
| Ascorbic acid | 30 |
| Starch | 20 |
| Lactose | 55 |
| Polyvinylpyrrolidone | 5 |
| Talc | 4 |
| Magnesium stearate | 1 |
| | 120 |

A sealing coat is applied in the same manner as described in Example 1 under the conditions as shown in Table 3. Both types of coated and uncoated tablets are aged in an atmosphere at 37° C. and 85% relative humidity, respectively.

Salicylic acid content formed by decomposition of acetylsalicylic acid in A and B are shown in Tables 4 and 5, respectively, and the percent of the original amount of thiamine and ascorbic acid remaining in tablets are shown in Table 6.

*Table 3*

| Formula | Type of polymer | Solvent | Concentration by weight/volume | Thickness in microns |
|---|---|---|---|---|
| A | No. 16 | CCl$_4$ | 7 | 119.0 |
| A | No. 18 | Benzene | 10 | 127.5 |
| A | No. 20 | CCl$_4$ | 10 | 80.8 |
| A | No. 15 | Benzene | 10 | 57.3 |
| B | No. 18 | do | 10 | 84.3 |
| B | No. 20 | CCl$_4$ | 10 | 112.6 |
| C | No. 18 | Benzene | 10 | 127.5 |
| C | No. 20 | CCl$_4$ | 10 | 80.8 |

*Table 4*

| Formula | Type of polymer | 10 days, percent | 20 days, percent | 32 days, percent | 44 days, percent |
|---|---|---|---|---|---|
| A | Uncoated | 4.03 | 15.37 | 29.50 | 47.0 |
| A | No. 16 | 3.12 | 7.28 | 9.53 | 10.63 |
| A | No. 18 | 2.39 | 4.59 | 5.88 | 6.62 |
| A | No. 20 | 1.73 | 2.65 | 3.59 | 5.26 |
| A | No. 15 | 1.38 | 3.07 | 3.56 | 5.07 |

*Table 1—Recipes*

| No. | Vinylpyridine (g.) | Comonomer (g.) | Solvent (g.) | Catalyst (g.) | Emulsifier (g.) | Temp. °C. | Time (hrs.) | Limiting viscosity | Vinylpyridine content (percent) |
|---|---|---|---|---|---|---|---|---|---|
| 1 | 2-vinyl, 19.5 | | 10%H$_2$SO$_4$, 184 | K$_2$S$_2$O$_8$, 0.4 | | 50 | 10.3 | 0.69 | |
| 2 | 2-vinyl, 5.3 | V. acetate, 8.6 | CH$_3$OH, 4 | B.P.O., 0.4 | | 55 | 23.5 | 0.11 | 98.3 |
| 3 | 2-vinyl, 2.0 | Acrylonitrile, 1.1 | 10%H$_2$SO$_4$, 20 | K$_2$S$_2$O$_8$, 0.08 | 0.04 | 60–70 | 3.0 | 0.45 | 91.8 |
| 4 | do | Methyl acrylate, 1.7 | 10%HCl, 8 | do | 0.04 | 60–70 | 3.0 | 0.22 | 93.4 |
| 5 | 2-vinyl, 10.6 | Styrene, 10.5 | 10%H$_2$SO$_4$, 100 | K$_2$S$_2$O$_8$, 0.2 | 0.4 | 50 | 33.4 | 1.87 | 75.5 |
| 6 | 4-vinyl, 5.3 | | | B.P.O., 0.1 | | 50 | 2.0 | 0.26 | |
| 7 | 4-vinyl, 23.8 | V. acetate, 34.4 | CH$_3$OH, 16 | B.P.O., 0.9 | | 50 | 19.2 | 0.389 | 97.2 |
| 8 | 4-vinyl, 15.4 | Acrylonitrile, 11.0 | CH$_3$OH, 10 | B.P.O., 0.2 | | 50 | 6.3 | 0.60 | 97.4 |
| 9 | 4-vinyl, 23.8 | Methyl acrylate, 17.2 | CH$_3$OH, 16 | B.P.O., 0.4 | | 50 | 15.6 | 1.05 | 90.8 |
| 10 | do | Styrene, 20.8 | 10%H$_2$SO$_4$, 200 | K$_2$S$_2$O$_8$, 0.4 | 0.8 | 50 | 7.6 | 1.08 | 92.5 |
| 11 | 2-methyl-4-vinyl, 23.8 | | do | do | | 50 | 49.0 | 1.04 | |
| 12 | do | V. acetate, 34.4 | CH$_3$OH, 16 | B.P.O., 0.9 | | 50 | 19.2 | 0.389 | 97.2 |
| 13 | 2-methyl-4-vinyl, 15.4 | Acrylonitrile, 11.0 | CH$_3$OH, 10 | B.P.O., 0.2 | | 50 | 6.3 | 0.69 | 97.4 |
| 14 | 2-methyl-4-vinyl, 23.8 | Methyl acrylate, 17.2 | CH$_3$OH, 16 | B.P.O., 0.4 | | 50 | 15.6 | 1.05 | 90.8 |
| 15 | do | Styrene, 20.8 | 10%H$_2$SO$_4$, 200 | K$_2$S$_2$O$_8$, 0.4 | 0.8 | 50 | 7.6 | 1.08 | 92.5 |
| 16 | 5-ethyl-2-vinyl, 6.7 | | 10%H$_2$SO$_4$, 50 | K$_2$S$_2$O$_8$, 0.05 | | 50 | 1.0 | 2.04 | |
| 17 | do | V. acetate, 4.3 | 10%H$_2$SO$_4$, 25 | K$_2$S$_2$O$_8$, 0.1 | 0.1 | (¹) | 9.0 | 0.72 | 81.2 |
| 18 | 5-ethyl-2-vinyl, 40.0 | Acrylonitrile, 15.9 | CH$_3$OH, 25 | B.P.O., 0.2 | | 70 | 2.6 | 1.21 | 55.9 |
| 19 | 5-ethyl-2-vinyl, 26.6 | Methyl acrylate, 17.2 | CH$_3$OH, 20 | B.P.O., 0.5 | | 50 | 24.0 | 0.83 | 80.8 |
| 20 | 5-ethyl-2-vinyl, 200.0 | Styrene, 100.0 | CH$_3$OH, 80 | B.P.O., 5.0 | | 55 | 40.0 | 0.80 | 57.2 |

¹ Room temperature.

*Table 2*

| No. of coating material | Coating solution | | Thickness of film (microns) | Disintegration time | |
|---|---|---|---|---|---|
| | Solvent | Concentration, percent | | Distilled water (hrs.) | Artificial gastric juice (min.) |
| 1 | CH$_3$OH | 20 | 202 | 4 | 5–10 |
| 2 | CH$_3$OH | 20 | 205 | 2–3 | 5–10 |
| 3 | CH$_3$OH | 20 | 201 | 4 | 5–15 |
| 4 | CH$_3$OH | 20 | 209 | 2–3 | 5–10 |
| 5 | CH$_3$OH | 20 | 180 | 4 | 5–15 |
| 6 | CH$_3$OH | 20 | 222 | 4 | 7–10 |
| 7 | CH$_3$OH | 20 | 235 | 4 | 7–10 |
| 8 | CH$_3$OH | 20 | 220 | 4 | 7–10 |
| 9 | CH$_3$OH | 20 | 240 | 4 | 7–10 |
| 10 | CH$_3$OH | 20 | 201 | 4 | 7–10 |
| 11 | CH$_3$OH | 10 | 151 | 4 | 8–10 |
| 12 | CH$_3$OH | 10 | 154 | 2–3 | 9–10 |
| 13 | CH$_3$OH | 10 | 156 | 4 | 15–16 |
| 14 | CH$_3$OH | 10 | 112 | 4 | 15–16 |
| 15 | CH$_3$OH | 10 | 148 | 4 | 8–10 |
| 16 | CCl$_4$ | 10 | 159 | 4 | 5–10 |
| 17 | CCl$_4$ | 10 | 220 | 4 | 5–10 |
| 18 | CCl$_4$ | 10 | 212 | 4 | 5–10 |
| 19 | CCl$_4$ | 10 | 207 | 4 | 5–10 |
| 20 | CCl$_4$ | 10 | 150 | 4 | 5–10 |

*Table 5*

| Formula | Type of polymer | 10 days, percent | 16 days, percent | 22 days, percent | 28 days, percent |
|---|---|---|---|---|---|
| B | Uncoated | 52.1 | 68.0 | 81.5 | 92.0 |
| B | No. 18 | 8.9 | 9.1 | 9.5 | 10.3 |
| B | No. 20 | 7.3 | 7.8 | 7.8 | 8.8 |

*Table 6*

| Formula | Type of polymer | Thiamine Mononitrate | | | Ascorbic Acid | | |
|---|---|---|---|---|---|---|---|
| | | 10 days, percent | 27 days, percent | 47 days, percent | 20 days, percent | 38 days, percent | 47 days, percent |
| C | Uncoated | 97.4 | 81.8 | 66.3 | 79.0 | 55.5 | 43.5 |
| C | No. 18 | 97.8 | 86.8 | 74.1 | 87.0 | 70.5 | 65.0 |
| C | No. 20 | 98.9 | 88.3 | 75.7 | 90.0 | 75.0 | 68.0 |

We claim:

1. A body of solid material having a film-forming protective coating thereon which is water insoluble and acid soluble, said coating being selected from the group consisting of polyvinylpyridines and copolymers of vinylpyridines and a monomer selected from the group consisting of vinylacetate, acrylonitrile, methyl acrylate and styrene.

2. A body according to claim 1 characterized in that said body is a tablet.

3. A body according to claim 1 characterized in that said body is a pharmaceutical composition.

4. A body according to claim 1 characterized in that said vinylpyridine is a 2-vinylpyridine.

5. A body according to claim 1 characterized in that said vinylpyridine is a 4-vinylpyridine.

6. A body according to claim 1 characterized in that said vinylpyridine is a 2-methyl-5-vinylpyridine.

7. A body according to claim 1 characterized in that said vinylpyridine is a 5-ethyl-2-vinylpyridine.

8. A body according to claim 1 characterized in that said coating is moisture resistant.

9. A body according to claim 1 characterized in that said coating is oxygen resistant.

10. A body according to claim 1 characterized in that said coating is soluble in dilute mineral acids.

References Cited in the file of this patent
UNITED STATES PATENTS 2,976,214    Ida -------------------- Mar. 21, 1961

OTHER REFERENCES

"Transformulation to Film Coating," Gross et al., Drug and Cosmetic Industry, vol. 86, No. 2, February 1960, pp. 170–171, 264, 288–291.